United States Patent [19]
delValle et al.

[11] Patent Number: 5,260,082
[45] Date of Patent: Nov. 9, 1993

[54] BAKED GOODS, DOUGHS OR BATTERS, DRY MIXES AND METHODS FOR PRODUCING THEREOF

[75] Inventors: Frank delValle, Croton-on-Hudson; Emanuel O. Gbogi, Tarrytown; Fouad Z. Saleeb, Pleasantville, all of N.Y.

[73] Assignee: Kraft General Foods, Inc., Northfield, Ill.

[21] Appl. No.: 946,207

[22] Filed: Sep. 16, 1992

[51] Int. Cl.$^5$ .............................. A21D 2/08
[52] U.S. Cl. ................... 426/549; 426/649; 426/650; 426/653
[58] Field of Search ............... 426/549, 653, 649, 650

[56] References Cited

U.S. PATENT DOCUMENTS

| | | | |
|---|---|---|---|
| 3,954,999 | 5/1976 | Vidal et al. | 426/653 |
| 4,076,845 | 2/1978 | Johannson | 426/653 |
| 4,885,180 | 12/1989 | Cochran et al. | 426/241 |
| 4,957,750 | 9/1990 | Cochran et al. | 426/19 |
| 4,961,937 | 10/1990 | Rudel | 426/19 |
| 5,149,552 | 9/1992 | Vidal et al. | 426/321 |
| 5,213,838 | 5/1993 | Sheikh | 426/649 |
| 5,219,602 | 6/1993 | Saleeb et al. | 426/250 |

Primary Examiner—Jeanette Hunter
Assistant Examiner—Mary S. Mims
Attorney, Agent, or Firm—Linn I. Grim

[57] ABSTRACT

Improved baked goods, doughs or batters, dry mixes and methods for producing same are provided by the addition of a special calcium citrate reaction product to the flour-containing baking ingredients.

25 Claims, No Drawings

BAKED GOODS, DOUGHS OR BATTERS, DRY MIXES AND METHODS FOR PRODUCING THEREOF

BACKGROUND AND SUMMARY OF THE PRESENT INVENTION

The present invention relates to improved baked goods and to methods for producing same. More particularly, the invention relates to improved shelf-stable baked or fried bakery products and the doughs used in making these products. Baked or fried bakery goods which incorporate the teachings of this invention have been found to have improved texture, mouthfeel, softness, moistness, moisture retention among other highly desirable properties. The products of this invention further relate to a shelf-stable, refrigerated or freezer baked product which when reheated in a microwave oven will retain its palatability.

Problems have arisen with the use of microwave energy for heating traditional yeast-raised food products such as bread and roll products. Traditional bread and roll products become impalatable after short exposures to microwave energy. The term palatable or palatability refers to the eating quality of food products. Palatable food products are agreeable to the taste and possess an appetizing appearance and texture.

Upon exposure to microwave energy, the crust of traditional bread and roll products becomes extremely tough and/or soggy as water present within the baked good migrates to the surface crust but does not evaporate off. The crust of such microwave exposed products may become so tough that it is difficult to tear such products. The bread product itself may become soggy or develop hard lumpy portions. The crumb of the products becomes rubbery and gummy and is difficult to chew. Consequently, traditional bread and roll products, upon exposure to microwave energy, are not palatable.

U.S. Pat. No. 4,961,937 entitled "A Composition of Flours Containing Vital Gluten and Soluble Oat Dietary Fiber and a Baker Product Produced Therefrom" describes extensively the various methods of delaying staling and increase the keeping time of (shelf life) bread among other baked products. These approaches are classified into four categories: (1) dilution of the gluten and the weakening of crumb structure using materials such as banana pulp, amylopectin, dextrins and the like; (2) humectants to avoid dryness of the crumb using hydrocolloidal vegetable gums; (3) crumb softeners such as chemical emulsifiers and surfactants such as mono- and diglycerides of fatty acids, esters of diacetyl tartaric acid, calcium stearyl-2-lactylate and the like have been shown to increase initial bread softness; and (4) enzymes to remove amylose. None of these procedures were found to be effective in the commercialization of baked goods to significantly decrease the staling effect of bread or other related baked products. Procedures as described in U.S. Pat. No. 4,957,750 issued Sep. 18, 1990, were used to produce improved microwavable baked goods by adding protein modifiers and in U.S. Pat. No. 4,885,180 issued Dec. 5, 1989, incorporated a chemically modified starch derived from potato, corn, wheat, rice and combinations thereof to retain the palatability of the baked goods on microwaving.

Although the known protein modified baked goods and the chemically modified starch baked goods are satisfactory products after microwaving, this invention provides a simple and unique method to produce improved baked goods having outstanding baked goods' properties. An important ingredient of this present invention is described in copending patent applications, commonly assigned as the present application, U.S. Ser. No. 704,500, filed May 23, 1992, and U.S. Ser. No. 811,192, filed Dec. 21, 1991. A finely divided special type of calcium citrate is described as an anticaking agent for dry fructose-containing beverages in the first mentioned patent application and this special type of calcium citrate is also described in the second mentioned patent application as useful for opacifying and whitening aqueous food compositions. It has been discovered that this special calcium citrate added to flour-containing baking ingredients provides baking goods which are significantly improved.

DETAILED DESCRIPTION

This invention is directed to producing improved baked goods, flour-containing dough or batter for making the improved baked goods and to a dry mix used to make the intermediate dough or batter by adding to the dry mix liquids such as water or milk. The method of producing the products of this invention is by incorporating, into a flour-containing mixture capable of being baked, a special type of calcium citrate.

The calcium citrate compounds used in this invention are reaction products of a calcium compound selected from the group consisting of calcium hydroxide, calcium oxide and calcium carbonate, with citric acid wherein said reaction product has a mole ratio of calcium to citric acid from 2.50:2 to 2.95 to 2, preferably 2.61 to 2.92 and pH value in a 1% water slurry of said reaction product about 4 to below 7 preferably about 4.0 to about 6.5 at 25° C. The amounts of calcium citrate compounds which are added to the flour-containing mixture capable of being baked, can range from about 0.2 to about 5.0 weight percent, preferably from about 1 to about 3 weight percent of the baked goods.

In general, these calcium citrate crystals are prepared by spray drying a neutralization mixture prepared by neutralizing citric acid with a slurry of calcium carbonate or calcium oxide or calcium hydroxide in water, e.g., a slurry of calcium hydroxide under controlled conditions to assure the production of the present new calcium citrate salts. Temperature, slurry solid content, rate of mixing of reactants and agitation time before spray drying are critical parameters in determining the physical characteristics of final product.

In particular, the calcium citrate crystals are prepared by first neutralizing citric acid with calcium hydroxide while controlling the rate and conditions of the reaction as well as the degree of neutralization. In the present process, a calcium hydroxide aqueous slurry is reacted with a citric acid solution in water resulting in a strong exothermic reaction. The rate of reaction, concentration of reactants and varying conditions are all important factors in producing calcium citrate salts of the desired pH values, moisture content and particularly the desired particle size.

It is preferred to form two separate aqueous systems, one, a solution of citric acid and the second, a slurry of calcium hydroxide, calcium oxide of calcium carbonate and then mix the uniform slurry of calcium hydroxide or carbonate with the aqueous citric acid. The temperature of the mixture is not allowed to exceed about 60° C. The pH of the slurry so produced after through mixing should fall within the range of 4–6 and, if needed, should be adjusted to this range of pH. The slurry can be used as such or can be spray-dried or dried by other known drying steps.

The produced calcium citrate salt is very insoluble in water providing about 0.1% by weight solution at ambient temperature and slightly more soluble in hot water. During preparation of a batch and while waiting for spray drying of the batch the salts are present in the insoluble form, a slurry of tiny crystals which form aggregates of varying particle size ranging from 5 to 100 microns. In present experience, the best products are obtained by using the following conditions.

The solids level of the aqueous slurry of calcium citrate salt is maintained at 20–26% and preferably at 22–24% by weight based on anhydrous salt. The slurry temperature during spray drying is from 80°–90° F. To avoid gel formation in the aqueous slurry, especially at temperatures below 70° F., and recrystallization which can occur on prolonged storage, spray drying of the aqueous slurry is effected within about 4–5 hours after slurry preparation. The slurry is spray dried at an inlet temperature of from about 425° F. to about 460° F. to deliver a free-flowing white powder with a moisture content of less than 6% and bulk density of from about 0.3 to about 0.7 g/cc. Extensive mixing and especially homogenization prior to spray drying should be avoided since the aggregated particles of salt may be broken down into finer crystals.

The calcium citrate crystals generally have the following characteristics:

| | |
|---|---|
| Bulk Density | 0.33–0.66 g/cc |
| Granulation | 95% through 100 mesh or 150 microns |
| Rotatap, 8 min. | 10% maximum through U.S. 400 mesh or 38 microns |
| pH (1% by weight solution) | 4.0–6.5 |
| Appearance | free-flowing, white powder |

These salts are neutral or slightly acidic and have a well-defined crystal size. The salt can be employed in the form of the anhydrous salt or the hydrated salt. In the hydrated form, the salt can usually contain up to about 13–15% by weight of water of hydration. In general, it is preferred to use the salt in lower hydrated form with less than about 10% by weight of water of hydration. Of course, the hydrated salt can be dried to any level of water of hydration using known methods. On standing, the salt does not undergo any loss or gain of water during storage.

The concentration of salt in these compositions can range from about 0.2% to about 22% by weight of the composition.

The calcium citrate employed in the present invention is in the form of small platelet crystals. The average length of the crystals is below 3.0 microns, preferably about 1.5 microns, width below 2.0 microns, preferably about 1 micron and thickness below 1 micron, preferably 0.1 to 0.2 micron. During preparation, clusters of these platelets aggregate together to form spherical particles that range from about 5 to about 100 microns in diameter. Such clusters are readily separable by mechanical stirring in water of by merely allowing the clusters to stand in water for protracted periods of time, e.g., overnight at room temperature. A most efficient method for reducing the clusters to the individual platelets is the use of mechanical shear, as provided by a ball mill. Other mechanical stirring means that can be employed include homogenizers, microfluidizers or colloid mills.

When mixed with water, particularly at levels above 10% by weight, the present spray-dried calcium citrate salt platelets cause a significant increase in the viscosity of the mixture. Thus, at 15% to 20% by weight the aqueous calcium citrate compositions are in the form of thick pastes resembling soft cheeses and margarines in consistency. At 20% and higher levels, the mixtures tend to solidify, especially when highly efficient mechanical shear is used.

In contrast with the results obtained with the special calcium citrate crystals used in this invention, commercial tricalcium dicitrate, whether in hydrated form (13% $H_2O$) or after rigorous drying, does not exhibit the same properties and is ineffective when tested side-by-side with the calcium citrate used in this invention, or as an additive to aqueous food composition. Without being bound to any theory of operation of the present invention, the phenomena observed with the present new salts is attributable to the particle size of the salt crystals, relying almost completely on the shape, number and geometrical arrangement of the calcium citrate crystals as they disperse in the water phase of the new food compositions of this invention.

In accordance with the present invention, the baked goods is made by preparing the dough or batter by conventional means and techniques. The use of a straight dough process or sponge dough process, a brew process or other dough production techniques which include the use of a preliminary fermentation step are suitable for use with this invention. All standard formulations may be utilized. The use of straight dough and sponge dough methods and other dough production techniques which include the use of preliminary fermentation step are suitable with this invention.

With each formulation, the mixing, fermentation, shaping, proofing and baking steps are handled as is customary to a skilled artisan in the trade. All standard dough systems, straight, sponge, no-time and liquid ferment can be utilized with the present invention. After the dough is prepared and/or proofed, the product is baked for the appropriate time and temperature to achieve a complete bake.

The baked good product may be yeast-leavened and/or it may include chemical leavening agents within the dough. Various flours can be used to form the baked goods product of the present invention. Examples of such flours are those conventionally used in the baking industry, including bread flour, corn flour, potato flour and pastry flour.

Other conventional ingredients that may be included in the baked good formulations include shortening or lubricating agents, starch, salt, nonfat dry milk; whole eggs, dried eggs or dried egg yolk; flavoring agents which include natural and synthetic flavorings; food coloring; minerals and vitamins.

The baked good product may be shelf-stable, refrigerated or frozen.

The term "dough" as used herein is meant a mixture of flour and other ingredients stiff enough to knead or roll. The term "batter" as used herein consists of flour, liquids such as milk or water and other ingredients and is thin enough to pour or drop from a spoon. The term "dry mix" as used herein is meant to include the starting ingredients of the flour-containing mixture capable of being baked in combination with the special calcium citrate reaction product to which liquids such as water or milk are added to form the desired dough or batter.

This invention has been found to be useful in the production of baked goods, such as, but not limited to, bread-type products (e.g., breads, rolls, muffins and bagels), pizza crusts, sweet goods, laminated sweet goods, pastries, danish, doughnuts, cakes, cookies, waffles and the like. It may be desirable to modify existing dough or batter formulations and processes in order to optimize the use of our invention, but this can be done on a product-by-product basis, as desired, by skilled bakers.

The following examples are provided to further illustrate the invention.

EXAMPLE 1

A calcium citrate sample was prepared by reacting 2763.8 lbs. of citric acid with 1600 lbs. calcium hydroxide (97-98% $Ca(OH)_2$ by analysis) in the presence of 1433 gallons of water. The mole ratio of calcium hydroxide to citric acid was very slightly less than 3:2, actually 2.92:2. The citric acid (Pfizer fine granular, food grade) was mixed in a large batch tank with 675 gallons of cold water. The calcium hydroxide (Mississippi Lime, hydrated lime food code) was mixed in a separate batch tank with 675 gallons of cold water. The calcium hydroxide slurry is then pumped into the citric acid solution at a rate to deliver the entire slurry in 10-15 minutes. It is necessary to have good agitation during the entire reaction and mixing process. The remaining 83 gallons of water is used to rinse the calcium hydroxide tank and transport lines. Due to the heat of reaction, the temperature of the resultant slurry was increased from an initial value of 15° C. (60° F.) to a maximum of 57° C. (134° F.). After the reaction is complete, the batch is cooled to 80°-90° F. The final pH of this concentrated slurry (22% calcium citrate, dry basis) should fall within the range 3.8-4.6 or can be adjusted up or down using the reacting ingredients. The slurry is then dried via spray drying utilizing a rotary wheel (7600 rpm). The outlet temperature was adjusted to 225° F. and the inlet temperature was 450° F. The calcium citrate powder obtained after spray drying was a free-flowing white powder with a moisture less than 6.0% and a bulk density in the range 0.33-0.65 g/cc. The pH of 1% slurry in water was 5.5. 95% of the powder passed through U.S. 200 mesh.

EXAMPLE 2

Experimental results are given below when anhydrous citric acid was neutralized using basic calcium salts (oxide or hydroxide). No calcium carbonate was used because of the large volumes of carbon dioxide that will be released during the reaction. The table gives the number of mols of calcium oxide or hydroxide added to 2 mols of citric acid and the pH of a 1% aqueous slurry of the resultant spray dried calcium citrate salt. (After reaction, agitation and spray drying as described in Example 1, 1 g of the resultant calcium citrate salt was dispersed in 100 ml distilled water for pH measurements.)

TABLE I

| MOLAR RATIO OF CITRIC:CALCIUM IN CALCIUM CITRATE | | |
|---|---|---|
| Citric Acid (Mol) | Calcium (Mol) | pH (1% Slurry in Water) |
| 2 | 2.375 | 3.95 |
| 2 | 2.613 | 4.04 |
| 2 | 2.850 | 4.64 |
| 2 | 2.910 | 5.25 |
| 2 | 2.910 | 5.33 |
| 2 | 2.92 | 5.5 |
| 2 | 2.99 | 7.28 |

Commercially available tricalcium citrate (3 calcium mols to 2 mols citric; $Ca_3(Cit)_2$ shows a pH of 9-11 (a 1% slurry in water at 25° C.). It is evident from the table that the composition range of our calcium citrate (slurry pH between 4 and 7) is $Ca_{2.5}(Cit)_2$ to $Ca_{2.95}(Cit)_2$ for pH values in the range of 4-7.

The new calcium citrate salts of this invention are distinct from tricalcium citrate which is commercially available (Pfizer; Inc.) as is obvious from the following data:

| Commercial Tricalcium Citrate (Pfizer, Inc.) | | New Calcium Citrate Salts of the Invention |
|---|---|---|
| 10.66 | Moisture % | Less than 5.5 |
| 17.64 | % Ca | 22.16 |
| 19.74 | % Ca (dry wt.) | 23.7 |
| 9-11 | pH | 4-7 |

EXAMPLE 3

Bread rolls were prepared with and without calcium citrate of the present invention. The weight of the ingredients are given in Table II. They are divided into two major mixtures, the sponge and the dough ingredients.

TABLE II

| COMPOSITION OF BREAD ROLLS | | | |
|---|---|---|---|
|  | Control | Variant I | Variant II |
| A. Sponge Ingredients | | | |
| Calcium Citrate (Example 1) | 0.0 g | 5.9 g | 11.8 g |
| Wheat Flour (Patent) | 325 g | 325 g | 325 g |
| Wheat Protein (Vital wheat gluten) | 10 | 10 | 10 |
| Fresh Yeast | 8.75 | 8.75 | 8.75 |
| Yeast Food (Arkady Co.) | 2.5 | 2.5 | 2.5 |
| Shortening (hydrogenated vegetable oil) | 45.0 | 45.0 | 45.0 |
| Dough Strengthener (Myvatex Co.) | 2.5 | 2.5 | 2.5 |
| Modified Food Starch (Perfectamyl AC E1420, Avebe Veedam, Netherlands) | 50.0 | 50.0 | 50.0 |
| Mono & Di-glyceride (65K Breddo Inc.) | 1.25 | 1.25 | 1.25 |
| Water | 167.5 | 167.5 | 167.5 |
| B. Dough Ingredients | | | |
| Wheat Flour (Patent) | 175.0 g | 175.0 g | 175.0 g |
| Salt | 10.0 | 10.0 | 10.0 |
| Karo High Fructose Corn Syrup (Best Food Co.) | 93.75 | 93.75 | 93.75 |
| Sugar | 15.0 | 15.0 | 15.0 |
| Water | 122.5 | 122.5 | 122.5 |

For all the examples given in Table II, the dry ingredients were weighed and mixed together in a Hobart Mixer. The water and other wet ingredients were added and mixed for 10 minutes (speed #2) and allowed to stand.

The sponge part of the rolls were allowed to ferment for four hours (room temperature) before mixing it with its corresponding dough ingredient part. The mixing was carried out for 10 minutes in Hobart Mixer at speed #2. After this step, 55 g of dough samples were weighed, put into baking molds, allowed to proof for 60 minutes at 100° F. and 85% relative humidity before baking. Baking of samples in bun trays was achieved at 425° F. for 13 minutes. Samples were allowed to cool to room temperature, removed from pan and stored in plastic bags overnight.

The volume of the baked rolls were then determined by Rape seed volumetric analysis. The volumes (average of four rolls for each example) are given in Table III together with the average weight of each baked set.

It is clearly evident that the addition of calcium citrate of this invention has significantly increased the volume of the baked rolls at least 30%. The volume increase is even significantly higher for Variant I (0.57% calcium citrate in the dough before baking and and 0.67% in the baked rolls) as compared with control (no calcium citrate).

TABLE III

EFFECT OF CALCIUM CITRATE ON VOLUME ON BREAD ROLLS

| Sample | Volume (cc) | Weight |
|---|---|---|
| Control | 110 | 48.0 g |
| Variant I | 186 | 46.5 |
| Variant II | 143 | 49.0 |

In addition it was noticed during the dough mixing that the presence of this calcium citrate has made it much easier to form a consistent dough texture in a shorter time than the control (7 min. vs. 10 min. for control). The eating quality of the fresh variants was as good as the control.

EXAMPLE 4

Storage Studies of Baked Goods

The eating and texture quality of the bread rolls of Example 3 were followed up to three days to determine the degree of freshness loss of the controls vs. the variants. The freshly baked rolls were put in polyethylene closed bags at room temperatures and monitored organoleptically (eating quality) as well as instrumentally (texture measurements using Instron, Instron Universal testing instrument made by Instron Corp., Canton MA).

The results of these tests are given below:

| Age of Rolls Days | Samples | Firmness (Dynes × $10^{-6}$) | Extensibility (cm) |
|---|---|---|---|
| 1 Day | Control | 1.43 | 1.56 |
| | Variant I | 0.97 | 2.15 |
| | Variant II | 1.42 | 1.92 |
| 3 Days | Control | 1.99 | 1.46 |
| | Variant I | 0.94 | 2.17 |
| | Variant II | 1.78 | 1.97 |

The organoleptic evaluations of the stored samples indicate that both variants are much slower to stale than the control. The control is more firm and less extensible than the calcium citrate containing variants. The difference is larger as the rolls were kept for three days at room temperature. Staling is the loss of freshness of baked goods and is manifested in the increase of both firmness and crumbliness as function of time. The calcium citrate of this invention seems to retard that undesirable natural staleness process.

EXAMPLE 5

A French type bread was prepared from the following ingredients:

| Wheat Flour | 300 g |
|---|---|
| Hydrogenated Vegetable Oil (Shortening) | 6 |
| Non-Fat Dry Milk | 6 |
| Salt | 6 |
| Yeast (Dry) | 1 |
| Yeast Food | 1 |
| Malt Flavor | 1 |
| Water | 192 |

Spray dried calcium citrate of Example 1 was mixed with soy oil at the level of 20:80 by weight. The mixture was then micromilled in a Dynomill to produce an oily paste. 6 grams of that calcium citrate—soy oil paste was added to the formula above to replace the hydrogenated vegetable oil with a more healthier unsaturated oil hardened physically by the calcium citrate of this invention.

Control and the variant (containing calcium citrate), breads were made with the aid of National Automatic Bread Maker. The ingredients were weighed into the bread maker without yeast. The yeast was placed in a special compartment of the bread maker whereby it was automatically released by the bread maker to the rest of the formulation at the appropriate time. After proofing and baking (total of four hours) the control and the variant samples were carefully taken out and allowed to cool to room temperature. Both loaves were stored in plastic bags for moisture equilibration at room temperature until the next day.

The volume of the baked bread samples were then measured using the rapeseed volumetric method. It was found that the volume of the calcium citrate-containing variant to be 5.6% higher than the control, even though the weight of the baked control was 1.2% higher than the variant. Again, this experiment with a large loaf and a lower level of calcium citrate confirms the volume increase of baked goods as shown by the rolls in Example 3. In this experiment the level of calcium citrate was only 1.2 g or 0.23% by weight of this proofed but unbaked variant.

In this example, the effect of microwave energy on the texture and eating quality of one day old bread was investigated. The freshly baked breads were good quality eating products. However, the control showed increased signs of staleness as compared with the variant. About half inch slices of the variant and the control breads (1 day old) were heated simultaneously in a microwave oven for exactly the same time (15 sec.). After cooling both the eating quality and texture measurements of the variant indicate a more moist, softer bread than the control. The control with no calcium citrate was more tough and rubbery on chewing.

EXAMPLE 6

Plain lean bagels were made with calcium citrate as described in Example 1 (variants I and III) as well as a commercially available tricalcium dicitrate from Merck Co. (variant II). A control with no calcium citrate was also included as shown below.

| Composition of Bagels | | | | |
| --- | --- | --- | --- | --- |
| | Control | Variant I | Variant II | Variant III |
| Wheat Flour | 400 g | 400 g | 400 g | 400 g |
| Sugar | 2.48 | 2.48 | 2.48 | 2.48 |
| Salt | 7.92 | 7.92 | 7.92 | 7.92 |
| Water | 213.32 | 213.32 | 213.3 | 275.72 |
| Yeast | 2.92 | 2.92 | 2.92 | 2.92 |
| Calcium Citrate (Example I) | — | 6.24 | — | 6.24 |
| Tricalcium Dicitrate (Commercial) | — | — | 6.24 | — |

Variant III was included to examine the water retention potential of calcium citrate of Example 1. The water content of this formulation has been increased by 10 times the amount of calcium citrate. A control containing this higher level of water (275.72g vs. 213.32g) produced an English muffin-type of texture and a bagel form cannot be produced.

Powdered ingredients were dry-blended for 3 minutes in Hobart Mixer. Yeast was then added to the water and mixed with dry ingredients to make the dough (15 min. mixing). The doughs formed from the above ingredients were allowed to relax for thirty minutes and then formed into bagel rings. 97 gm of dough was scale weighed for each ring, proofed in a warm room for 50 minutes and refrigerated. On the next day, samples were taken out of the refrigerator, allowed to equilibrate to room temperature and boiled in 2.5% sugar solution for 30 seconds on each side. After this treatment the samples were placed on baking trays and baked at 425° F. for 25 minutes. When the bagels were cooled to room temperature, part of each sample was placed in plastic bags and stored in a freezer. The rest of each sample was left at room temperature.

On evaluation of the freshly baked samples, these observations were found.

1. The bagels with calcium citrate were found to be softer and have higher volume than the control bagel. Variant III was the softest while Variant II was the least soft (vs. Variant I) and has the least volume increase over control.

2. There was no difference in taste between the bagels made from calcium citrate of Example 1 and the control. However, there was an off-taste perceived in the bagels made up with commercial calcium citrate.

On evaluating these bagels as a function of time it was found that after 1 day at room temperature, the degree of staleness of the bagels were as follows. Control: very stale, Variants I and III least stale while Variant II (commercial tricalcium dicitrate) was relatively stale. These differences were much more evident after storage for more than 1 day at room temperature in closed plastic bags.

On microwaving these aged bagels (1 day and 2 days old) under the same conditions (25 seconds) the bagels with calcium citrate of Example 1 were much softer and of a good eating quality then the control and Variant II. Both Variant II and control has rubbery texture and poor eating quality.

It is evident that inclusion of calcium citrate of this invention produced a better quality bagels than the control or samples including commercially available tricalcium dicitrate. It was also noticed that during preparations samples containing calcium citrate of Example 1 took less time to form cohesive (non sticky) more firm and hence easier to handle doughs than the control.

EXAMPLE 7

A fat free commercial dry mix was purchased and prepared without and with 1% calcium citrate of Example 1. The control without calcium citrate was prepared by adding 1⅛ cup of water to 463.7 gm of the mix and beat, initially, at low speed for 30 seconds in 4 quart glass bowl. As directed by the manufacturer, the mix was then beat on medium speed for 1 minute without loss of sample. Sample was poured into ungreased muffin/bun tray and baked for 25 minutes or until crust was deep golden. Samples were allowed to cool to room temperature and with a metal spoon, cakes were removed from pan. Samples were then put in bag and allowed to stay overnight at room temperature.

The variable sample (with spray dried calcium citrate of Example 1) was prepared by adding 4.652 g of calcium citrate and 1⅛ cup of water to 465.2 g of the mix. Cake was made and stored overnight exactly the same way as the control.

Storage Studies

After cutting and tasting, the control and the variant sample were subjected to tensile measurement (punch and die) using the Instron Universal Testing Instrument made by Instron Corp., Canton MA, to quantify the textural differences perceived in the two samples. The eating quality and textural quality of the cake was monitored using exactly the same procedure as in Example 4. The result obtained is as shown below on Table IV. The firmness data shows that the samples with calcium citrate stale at a lesser rate than those without control. This finding was also supported by the eating quality of the cake.

TABLE IV

FIRMNESS (STALENESS) OF THE CAKE AT ROOM TEMPERATURE

| Age of Cake | Sample | Firmness (Dynes × $10^{-6}$) | Extensibility (cm) |
| --- | --- | --- | --- |
| 1 day | Control | 0.83 | 2.39 |
| | Variant | 0.91 | 2.48 |
| 2 days | Control | 1.12 | 2.46 |
| | Variant | 1.06 | 2.49 |

Microwavability

The two samples reported in this Example, were heated by microwave energy for 25 minutes to determine the effect of calcium citrate on freshness of the cake after one day from baking. The control and the variable samples were subjected to tensile measurements using the Instron and to eating quality evaluation. Again the calcium citrate containing variable was found to be less firm than the control after microwave heating. These instrumental conclusions were also reflected in the eating quality of the samples. Some moisture loss were expected during microwave heating.

To determine water loss (dryness) during microwaving, samples were weighed before and after microwave heating. The sample with calcium citrate was found to loose less water than the control. For 25 seconds of heating on high setting of the microwave oven, the moisture loss for the control as 12%, while it was 10% for the variant. The firmness data shown below reflects these lower moisture in these one day old microwaved cakes.

| FIRMNESS OF ONE DAY OLD CAKE AFTER MICROWAVE HEATING FOR 25 SECONDS | | |
|---|---|---|
| Sample | Firmness (dynes $\times 10^{-6}$) | Extensibility (cm) |
| Control | 3.85 | 2.52 |
| Variant | 2.80 | 2.54 |

The commercial dry cake mix has these ingredients; sugar, wheat flour bleached, egg white, leavening (baking soda, citric acid), modified corn starch, artificial flavor, modified soy protein, xanthan gum, sodium hexa-phosphate, sodium lauryl sulphate (a whipping aid).

EXAMPLE 8

A shelf stable waffle/pancake was made according to the following formulation with calcium citrate of Example 1 land without further additive.

| | % Composition | |
|---|---|---|
| Ingredients | Control | Variant |
| Heavy cream | 25.50 | 25.50 |
| All purpose flour | 22.18 | 17.22 |
| Egg yolk (liquid) | 15.52 | 15.52 |
| Sugar | 11.10 | 11.10 |
| Egg white | 8.92 | 8.92 |
| Margarine | 7.90 | 7.90 |
| Corn syrup | 4.43 | 4.43 |
| Baking soda | 2.88 | 2.88 |
| Salt | 0.55 | 0.55 |
| Vanilla extract | 0.44 | 0.44 |
| Gatado | 0.40 | 0.40 |
| Potassium sorbate | 0.10 | 0.10 |
| Xanthan gum | 0.08 | 0.04 |
| 18% Calcium citrate/water dispension | — | 5.00 |

200 g samples of variant and control were made. The variant has a paste of 10 g of 18% calcium citrate micromilled in water (i.e., 0.9% of the formulation is calcium citrate). The powdered ingredients were weighed and dry blended followed by the addition of the wet ingredients. 33 g of batter was used to make each pancake. Batter was heated on each side between 324°–345° F. for 4 minutes on a grill. After cooling at room temperature, each pancake was stored in foil pouches and sealed. All samples were stored for 96 hours at room temperature. Microwavability The two pancakes, the control and the variant, were then subjected to microwave heating at the same time on a rotating stage, followed by eating quality evaluation. While there was no significant difference in the taste (sweetness, flavor) of the variant vs. control, there was significant improvement in the eating quality (texture) of the calcium citrate-variant vs. control. Even though the variant has more water and less flour than the control the firmness of the batter as well as that of the grilled pancake was more preferred than the control.

It is evident that calcium citrate of Example 1 can modify as well as improve the texture of baked goods.

What is claimed is:

1. An improved baked good which comprises a baked flour-containing mixture selected from the group consisting of dough and batters incorporated therein about 0.2 to about 5 weight percent of said baked good, a reaction product of a calcium compound selected from the group consisting of calcium hydroxide, calcium oxide and calcium carbonate with citric acid therein said reaction product has a mole ratio of calcium to citric acid from 2.5:2 to 2.95:2 and a pH value in a 1% water slurry of said reaction product from about 4 to about 7 at 25° C.

2. The product of claim 1 wherein the calcium reaction product ranges from about 1 to about 3 weight percent of said baked good and a mole ratio of calcium to citric acid from 2.61:2 to 2.92:2.

3. The product of claim 2 wherein the calcium reaction product has a pH value in a 1% water slurry of said calcium reaction product of from about 4.0 to about 6.5.

4. A dry mix comprising a dough or batter flour containing mixtures capable of being baked and incorporated therein about 0.2 to about 5 weight percent of said dry mix, a reaction product of a calcium compound selected from the group consisting of calcium hydroxide, calcium oxide and calcium carbonate with citric acid and wherein said reaction product has a mole ratio of calcium to citric acid from 2.5:2 to 2.95:2 and a pH value in a 1% water slurry of said reaction product from about 4 to about 7° C. at 25° C.

5. The product of claim 4 wherein the calcium reaction product ranges from about 1 to about 3 weight percent of said dry mix and a mole ratio of calcium to citric acid from 2.61:2 to 2.92:2.

6. The product of claim 5 wherein the calcium reaction product has a pH value in a 1% water slurry of said calcium reaction product of from about 4.0 to about 6.5.

7. The product of claim 4 wherein a liquid is added to produce a dough or batter mixture.

8. The product of claim 7 wherein the liquid is water.

9. The product of claim 7 wherein the liquid is milk.

10. The product of claim 6 wherein a liquid is added to produce a dough or batter mixture.

11. The product of claim 10 wherein the liquid is water.

12. The product of claim 10 wherein the liquid is milk.

13. A method for preparing a baked good which comprises incorporating into a flour-containing mixture selected from the group consisting of dough and batters about 0.2 to about 5 weight percent of a reaction product of a calcium compound selected from the group consisting of calcium hydroxide, calcium oxide and calcium carbonate with citric acid and wherein said reaction product has a mole ratio of calcium to citric acid from 2:52 to 2.95:2 and a pH value in a 1 % water slurry of said reaction product from about 4 to about 7 at 25° C. and baking said dough or batter.

14. The method of claim 13 wherein the calcium reaction product ranges from about 1 to about 3 weight percent of said baked good and a mole ratio of calcium to citric acid from 2.6:2 to 2.92:2.

15. The method of claim 14 wherein the calcium reaction product has a pH value in a 1% water slurry of said calcium reaction product of from about 4.0 to about 6.5.

16. The product of claim 13 which is a cake.
17. The product of claim 15 which is a cake.
18. The product of claim 13 which is a bread product.
19. The product of claim 15 which is a bread product.
20. The product of claim 13 which is a bagel.
21. The product of claim 15 which is a bagel.
22. The product of claim 13 which is a waffle/pancake.
23. The product of claim 15 which is a waffle/pancake.
24. The product of claim 13 which is a doughnut.
25. The product of claim 15 which is a doughnut.

* * * * *